May 26, 1970      E. S. MILLER      3,513,965
CONVEYOR AND LINK
Filed Oct. 21, 1968      2 Sheets-Sheet 1
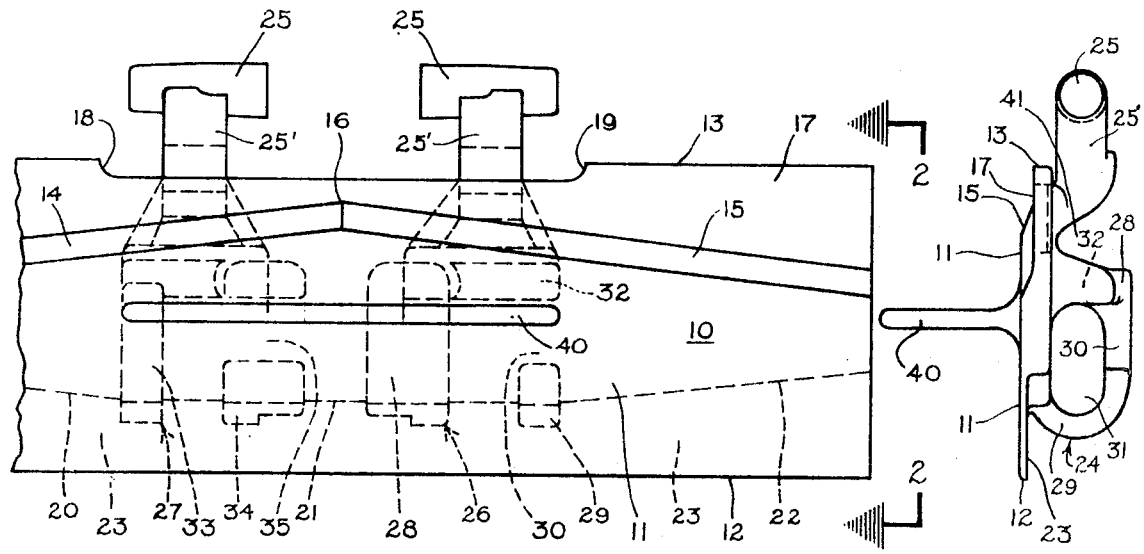
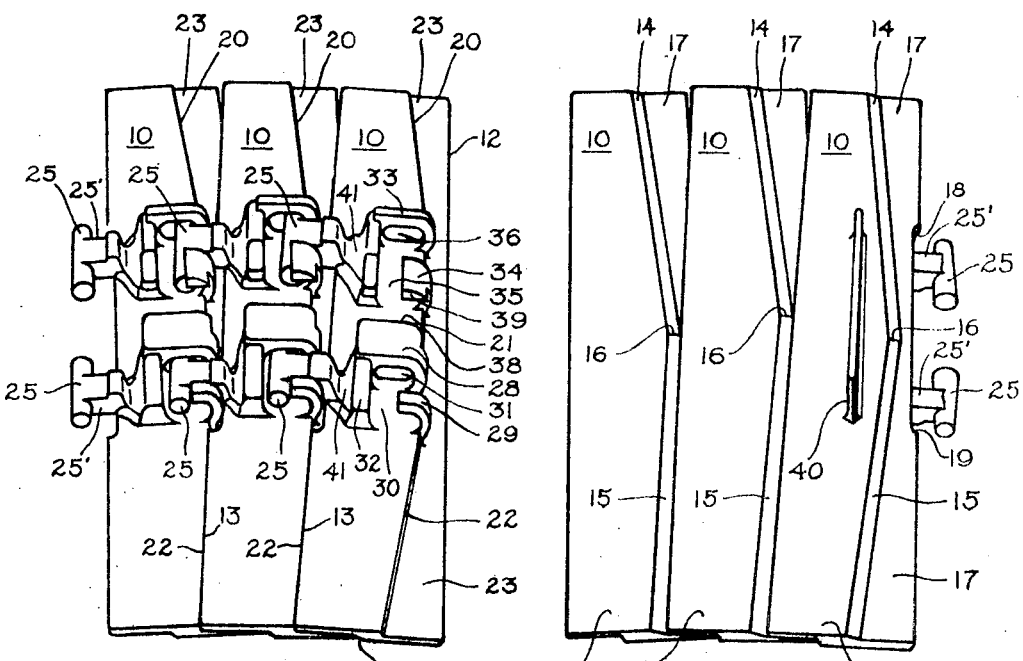
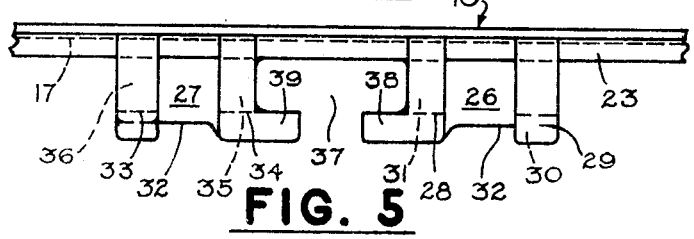
INVENTOR.
ELDON S. MILLER
BY Ernest Carl Edge

INVENTOR.
ELDON S. MILLER

United States Patent Office 3,513,965
Patented May 26, 1970

3,513,965
CONVEYOR AND LINK
Eldon S. Miller, 6645 SW. 129 Terrace,
Miami, Fla. 33156
Continuation-in-part of application Ser. No. 655,401,
July 24, 1967. This application Oct. 21, 1968, Ser.
No. 769,248
Int. Cl. B65g 15/30
U.S. Cl. 198—195    12 Claims

ABSTRACT OF THE DISCLOSURE

A linking unit which is articulated with like links to provide a conveyor with a supporting surface, each of said links having an interlocking element at one end and an interlocking linking element at the other end; and an interlocking element of a like unit adapted to be interlocked in the linking element in such a way that the articulated links may undergo angular movement in a common plane and in different planes. An endless conveyor is assembled from such a plurality of articulated links.

CROSS-REFERENCE TO RELATED APPLICATION

This application is a continuation-in-part of my co-pending application Ser. No. 655,401 filed July 24, 1967 now abandoned.

BACKGROUND OF THE INVENTION

This invention relates to a conveyor link and to an endless conveyor made up of a plurality of articulated conveyor links; in particular, the invention relates to a link and conveyor which has a substantially flat supporting surface and which can move along a changing path while accommodating to the changes of such a path.

Articulated links having flat surfaces have been driven by sprockets or the like in an endless path to carry various items on a flat surface or flat top. Such links have been articulated by use of pins engaging bores in aligned ears of immediately succeeding and following links. In general, such supporting surface links are articulated so that angular movement may occur between an adjoining pair of links as when the endless conveyor is traveling uphill or downhill.

Link conveyors of the foregoing type are useful, but have limited versatility in that the links are articulated by complex or permanent linkages, and have limited adaptability to angular movements of an adjoining pair of links in the endless path. It is desirable to add to the art a link in an endless conveyor comprising a plurality of articulated links which may be articulated in a new and improved manner, and which provide greater versatility in movement in its endless path. Such a link and articulated conveyor may be used in a variety of ways, such as in a restaurant, cafeteria, etc. for conveying dishes or trays with freshly prepared food or soiled dishes, or on trays which can be conveyed to a washing section in the kitchen.

SUMMARY OF THE INVENTION

It is accordingly one primary object of this invention to provide a new link which is adapted to be articulated with other like links to form an endless conveyor, said links being capable of articulation by a simple joiner step which articulates a pair of links.

Another object of this invention is a link and an endless conveyor of like links in which the articulated links permit angular movement in a plane common to a pair of adjoining links so that said pair may fan out when turning corners, for example.

Still another object is a link in a conveyor of like links in which a pair of adjoining links may both fan out in a common plane and form a dihedral angle in different planes so that angular movement may be effected, respectively, when turning corners; and going downhill and uphill.

Still another object is a unitary link which can be articulated with like links to form an endless conveyor, and which link has a substantially rigid integral body which can be articulated without using fasteners or the like.

Still another object of the invention is an integral link which forms a conveyor with like links, and which is substantially rigid but possesses some resiliency so that like links may be adjoined by a simple snap fit, and be released in a similar manner.

A still further object of the invention is an integral link which forms a conveyor with like links, and which can be articulated and released by an essentially snap fit without the use of fasteners or the like; and which snap fit provides a sufficient clearance so that a pair of adjoining links may fan out in coplanar angular movement, and which links may also form a dihedral in different planes when going uphill or downhill.

Yet a still further object of this invention is an integral link which may form a conveyor with like links, which link is adapted to cooperate with a guide in the path which the articulated links will follow so that the articulated links may be retained in said path without deflection.

Objects such as the foregoing are attained together with still other objects which will occur from time to time to those who consider the following disclosure, which includes drawings.

BRIEF DESCRIPTION OF THE DRAWINGS

FIG. 1 is a top plan view of a portion of one of the links;

FIG. 2 is a side elevational view of the link taken substantially along the line 2—2 of FIG. 1;

FIG. 3 is a perspective view of a portion of the bottom of an endless conveyor showing three adjoining articulated links with the links in a fanned out angular movement which occurs when the conveyor travels in a non-linear direction;

FIG. 4 is a perspective view of a portion of the top of an endless conveyor showing three adjoining articulated links in the same manner as FIG. 3;

FIG. 5 is a front elevational view of a portion of the link;

DESCRIPTION OF THE PREFERRED EMBODIMENT

Figure 6:
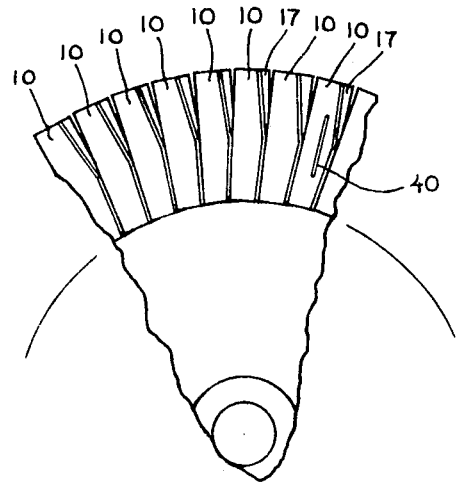
FIG. 6 is a portion of a top plan view of an endless conveyor with a plurality of similar and articulated links adapted to follow a circumferential path.

FIG. 1 illustrates the construction of an individual link 10 which is part of an endless conveyor. Link 10 has a relatively flat top or support surface or slat 11. As stated in my co-pending application referred to above, the term "slat" has particular meaning when a plurality of links are articulated to form a conveyor surface resembling "slats." The slat is shown with a front edge 13 and a back edge 12.

The support surface 11 is tapered at 14 and 15 with the two tapering surfaces joining at an angle at 16. Tapers 14 and 15 form a demarcation between surface 11 and a lowered portion 17 for a purpose to be explained subsequently. Front edge 13 has cut out portions 18 and 19 to accommodate the parts of linking elements in a preceding link.

As clearly illustrated in FIG. 3 and as shown in dotted line in FIG. 1, the under side of back edge 12 is undercut at 20, 21 and 22 to accommodate the surface 17 of the top surface of an adjoining link when the conveyor travels in a circumferential path such as that illustrated in FIGS. 5 and 6.

Undercuts 20 and 22 extend at an angle to and taper rearwardly from undercut 21 to provide an irregularly shaped bottom surface 23.

Link interengaging means, indicated generally at 24 in FIG. 2, is integrally formed with an extends downwardly and outwardly of the bottom surface of link 10. The interengaging means 24 comprises forwardly-extending, interlocking elements, each of which has a laterally-disposed substantially cylindrical pin 25 lying generally parallel to the plane of the supporting surface and connected to the underside of the connecting surface by posts 25'.

Spaced rearwardly from each of the interlocking elements 25, 25' and also depending from the bottom surface of link 10 are two receivers or linking elements 26 and 27 for receiving interlocking pins 25. Linking elements 26 has a continuous annular wall 28 and a split annular wall 29. Split annular wall 29 provides an opening or entry 30 and continuous annular wall 28 provides a through bore 31. The two annular walls are joined by transverse wall 32.

Linking element 27 has a continuous annular wall 33 and a split annular wall 34. Split annular wall 34 provides an opening or entry 35 and continuous annular wall 33 provides a through bore 36, said opening 35 and said bore 36 being provided to receive the interlocking element comprising a pin 25 and a post 25'.

As illustrated in FIG. 5 the two locking elements 26 and 27 define a passageway 37 of T-shaped cross-sectional configuration for a track members on which the conveyor travels. Wall 28 has a flange or leg 38 extending therefrom and wall 34 has a similar flange or leg 39 extending toward flange or leg 38 and spaced therefrom to define an entry to the passageway 37.

Any of the links 10 may be provided with a pusher bar 40 as shown in FIGS. 1, 2 and 4 on the top surface thereof for contacting items placed on the conveyor and moving them along with the belt. Links with the pusher bar thereon may be inserted anywhere desired and spaced at any interval desired along the conveyor.

Although pusher bar 40 is shown here as being integral with the body of the link it may be a separate unit and attached by any suitable means.

The space 41 (FIG. 2 and FIG. 3) between the interlocking pin posts 25 and the linking elements 26 and 27 provides a recess for the reception of a tooth of a sprocket which may be used to move the conveyor. The exact configuration of this space may be changed to adapt to the particular sprocket used.

Figure 7:
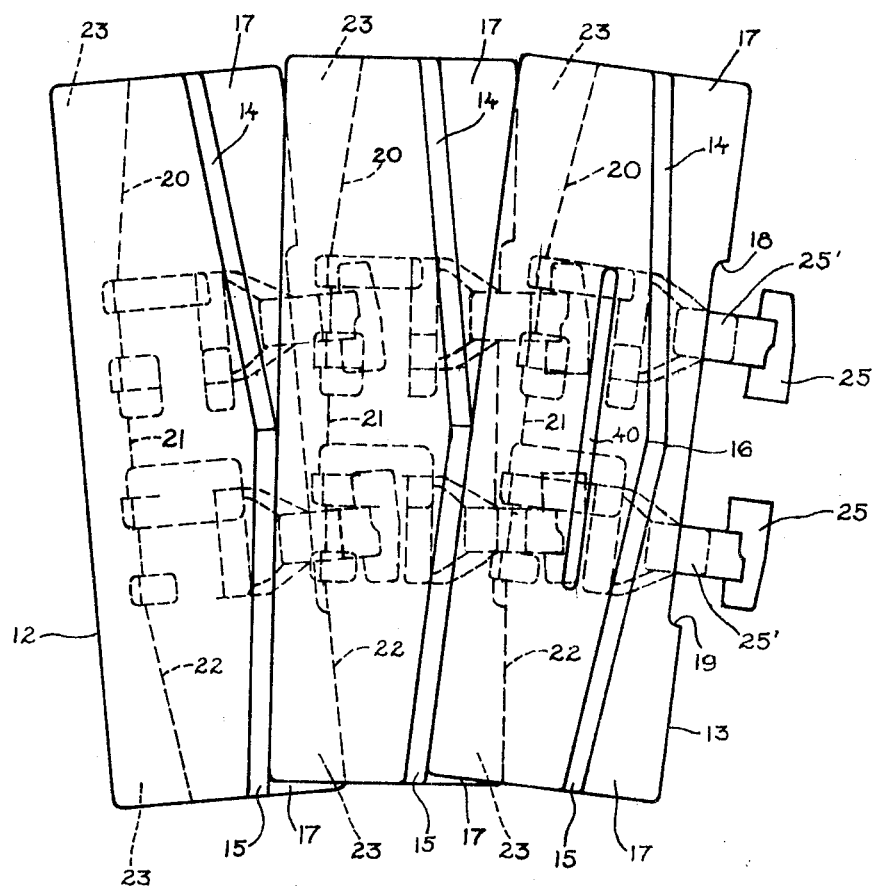
FIG. 7 is a portion of a top plan view, on an enlarged scale, of representative links in a fanned out angular movement when moving in a conveyor path of the type shown in FIG. 6.

FIGS. 6 and 7 illustrate the travel of a conveyor made of links according to my invention in a circumferential path. In such an arrangement the undercut underside 23 of a link will move over the lowered surface 17 of an adjoining link and fan out to provide a relatively flat top surface. When the links are fanned out as shown in these figures it is to be noted that due to the width of the surfaces 17 and 23 the opposite ends of the links do not separate any appreciable amount but provide a substantially closed flat surface on this end also. This provides an articulated conveyor which always provides a flat surface in the same manner that a fabric belt porvides a flat surface but provides the additional advantage of allowing the full-surfaced belt to turn corners in a flat plane as well as in a dihedral plane.

It will be apparent that an outstanding advantage of the present link and conveyors is that a plurality of links may be assembled and dissembled by simple articulation steps wherein an interlocking element at the front of a preceding link is snapped into place with a linking element towards the back of a succeeding link. No tools or fasteners are required to effect the articulation of a pair of adjoining links. Not only are the links simply articulated to form an endless conveyor, but the nature of the articulation leads to advantages because the substantially cylindrical pin which makes up the interlocking element has a dimension smaller than the bore formed within the linking element. This allows a sufficient clearance or play for the pin within the bore to permit ease of movement, either pivotable or separable, so that the conveyor links may move in different planes when going uphill or downhill; and may move in a common plane as when a pair of links fan out as when turning a corner in a common plane.

What is claimed is:

1. A conveyor link formed of relatively rigid plastic and adapted to be joined to other identical links which, when joined, permits link-to-link movement in a common plane and in different planes, said link comprising a substantially flat supporting surface having a front, a back and spaced sides; interengaging means extending from the underside of the supporting surface toward the front thereof, said means defined by a first pair of interlocking and linking elements mounted to the underside of the slot adjacent one side, and a second pair of interlocking and linking elements mounted to the underside of the slat adjacent the opposite side, the linking elements being positioned toward the back, the interlocking elements being positioned toward the front, each interlocking element including a pin with the long axis thereof disposed substantially parallel to the plane of the slat, each of the linking elements comprising a curved body having a bore with opposed open ends lying in planes normal to the plane of the slat, an entry in the body lying in a plane parallel to the plane of the slat and having a portion in communication with one of the open ends, and a continuous annular body defining the other of the open ends so that said pin may be inserted through the entry and then be laterally moved through the annular body to interlock the pin within the curved body, said interlocking element being engageable in a similar linking element with the interlock having sufficient play so that joined links may move angularly in a common plane and in different planes; and a guide member on the underside of the slat intermediate the pairs of elements having a slide passageway to engage a guide member to control travel of the links along a path, said passageway having a bottom entry defined by spaced legs extending from the front to the back to the slide passageway.

2. The conveyor link of claim 1 wherein the legs have tapered edges to facilitate entry of the guide member and wherein the front edge portion of the slat is undercut and the back of the slat area is lowered to allow an undercut slat edge of a joined link to overlap the lowered area in travel without causing vertical displacement of the slat.

3. The conveyor link of claim 1 wherein the flat supporting surface of the link is further defined by a taper along each side of the symmetrical axis of the link to accommodate a similar link when the links move in an angular path.

4. The conveyor link of claim 1 wherein the spaced legs have tapered edges.

5. The conveyor link of claim 1 wherein the substantially flat supporting surface is further defined by a front edge portion which is undercut and a back edge portion of the slat area which is lowered to allow an undercut slat edge of a mating link to overlap the lowered area during travel of the links along the conveyor path without causing substantial vertical displacement of the slats during overlap.

6. A conveyor link comprising, in combination, a substantially flat, rectangular, elongated support structure having opposed front and back edges and opposed side edges, link interengaging means integrally formed with the underside of said support structure, said link interengaging means comprising an interlocking element extending forwardly of said front edge and a linking element extending rearwardly of said interlocking element in mutually spaced relation, said interlocking element comprising a post portion joined at one end with said support structure, and a substantially cylindrical pin joined at a central position therealong to the other end of said post portion, the axis of symmetry of said post portion being substantially parallel with said front and back edges, said linking element comprising a continuous annular wall portion and a laterally-spaced split annular wall portion which, together, define a side-to-side through opening and a rearwardly-extending slot communicating with said through opening, said split wall portion further comprising an entry to said through opening extending outwardly substantially perpendicularly from the underside of said support structure, said entry end said slot being of sufficient width to receive for passage therethrough said post portion of a second link, rearwardly-extending end portions of said continuous and split annular wall portions of said link serving as abutments for end portions of the cylindrical pin of an interjoined link.

7. A conveyor link as defined in claim 6 wherein said interlocking element and said linking element define therebetween a recess operative to receive a rotary sprocket tooth for imparting translatory motion to a succession of interengaged links by the use of a sprocket wheel as a drive means.

8. A conveyor link as defined in claim 6 including a second link interengaging means integrally formed with the underside of said support structure and sidewardly spaced with respect thereto, facingly opposed continuous and split wall annular portions of said first and second linking elements being integrally formed at their undersides with inwardly-directed leg portions defining therebetween and with respect to the space between said first and second linking elements a slide passageway of T-shaped cross-sectional configuration for use as a track guide.

9. A conveyor link as defined in claim 8 wherein said side-to-side through openings are elongated in the front-to-back direction to permit relative angular motion in a common plane of a pair of such interjoined links.

10. A conveyor link as defined in claim 9 wherein the top of said support structure is formed with a lowered surface portion along a front marginal portion thereof, and wherein the bottom of said support structure is formed with a raised surface portion along a rear marginal portion thereof, said raised surface portion defining a recess for the reception of said front marginal portion of an interjoined successive link to permit placement of such interjoined links in a common plane.

11. A conveyor link as defined in claim 10 wherein said marginal lower end raised portions are defined by symmetrically-divergent step portions to accommodate said relatively angular motion in a common plane.

12. A conveyor link as defined in claim 11 wherein each of said interlocking and linking elements define therebetween a recess operative to receive one tooth each of a pair of laterally-spaced rotary sprockets operative to impart translatory motion to a succession of such interjoined links.

References Cited

UNITED STATES PATENTS

| 2,165,422 | 7/1939 | Stanius | 198—189 |
| 2,192,181 | 3/1940 | De Back | 198—181 |

FOREIGN PATENTS

| 587,791 | 5/1947 | Great Britain. |

RICHARD E. AEGERTER, Primary Examiner